M. MENNESSON.
MOTOR VEHICLE.
APPLICATION FILED DEC. 9, 1916.
1,308,602.
Patented July 1, 1919.
2 SHEETS—SHEET 1.
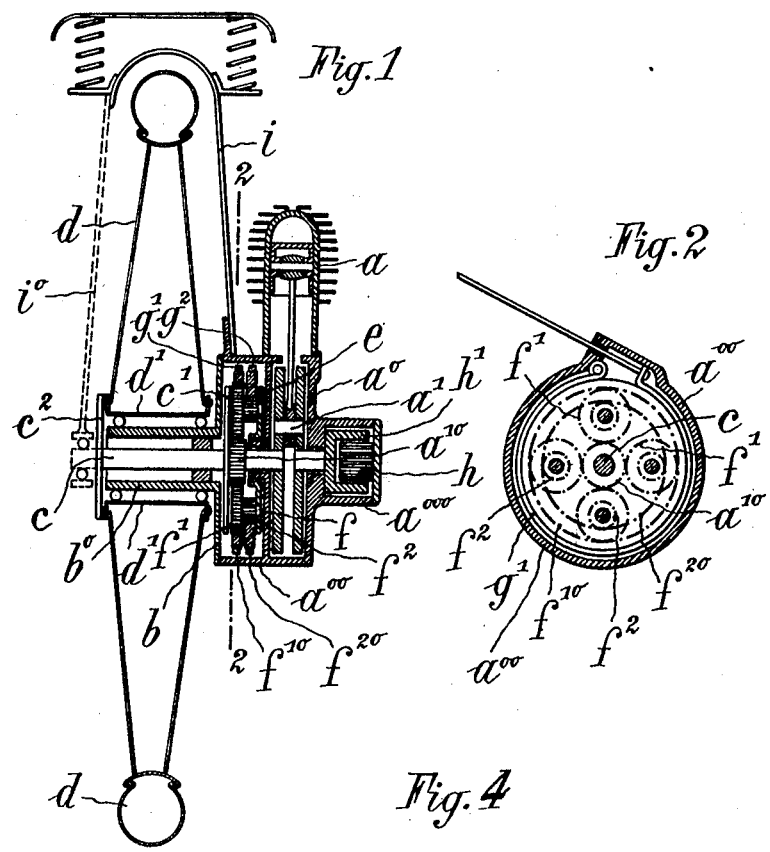
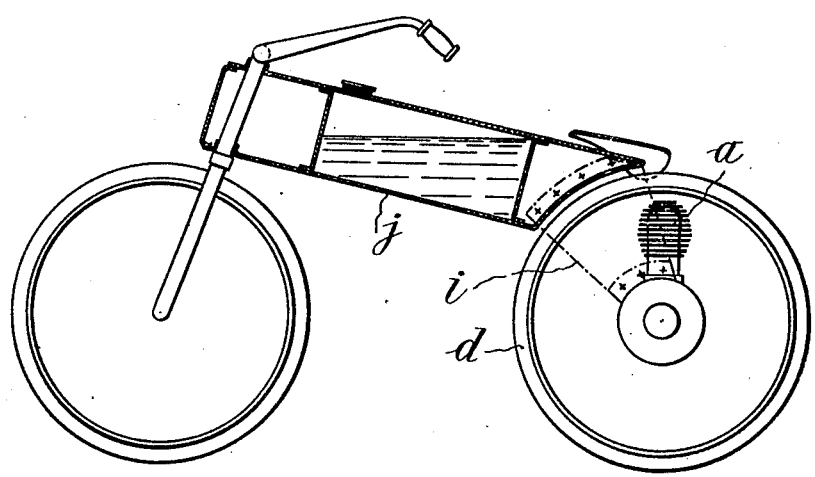

M. MENNESSON.
MOTOR VEHICLE.
APPLICATION FILED DEC. 9, 1916.
1,308,602.
Patented July 1, 1919.
2 SHEETS—SHEET 2.
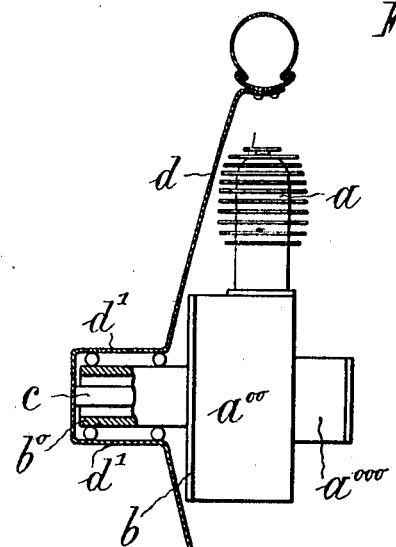
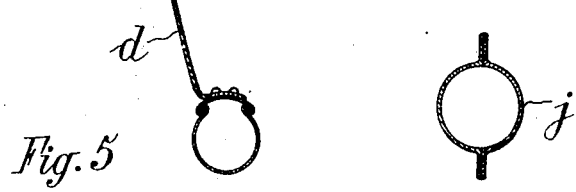
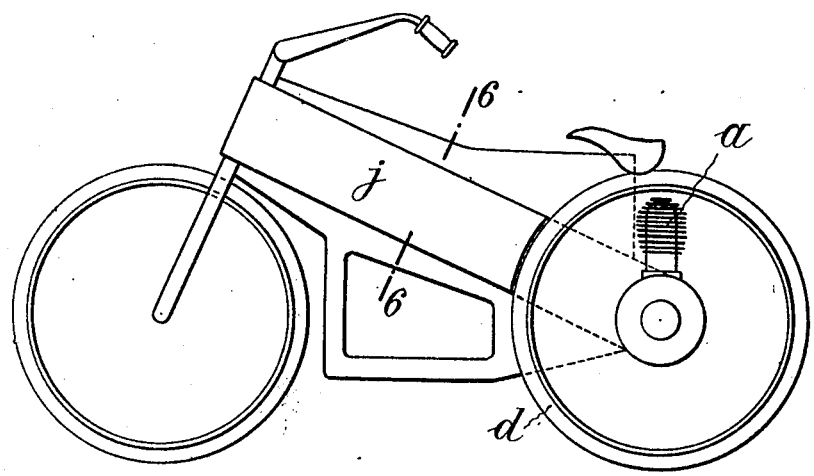
Witnesses:
Inventor
Marcel Mennesson
by James L. Norris,
Attorney

UNITED STATES PATENT OFFICE.

MARCEL MENNESSON, OF NEUILLY-SUR-SEINE, FRANCE, ASSIGNOR TO M. GOUDARD & MENNESSON, OF NEUILLY-SUR-SEINE, FRANCE.

MOTOR-VEHICLE.

1,308,602. Specification of Letters Patent. Patented July 1, 1919.

Application filed December 9, 1916. Serial No. 136,098.

*To all whom it may concern:*

Be it known that I, MARCEL MENNESSON, engineer, citizen of the French Republic, residing at Neuilly-sur-Seine, France, have invented certain new and useful Improvements in Motor-Vehicles, of which the following is a specification.

This invention relates to driving apparatus for the motive wheels of vehicles, in particular for the motive wheels of motor cycles.

It has for its principal object to so construct apparatus of the class in question, that, while comprising a change-speed mechanism and a clutch, it is of comparatively small dimensions, and may, if desired, be combined in a simple manner with a motive wheel, so as to form an integral part thereof, and be supported entirely by the said wheel.

According to the general principle of my invention, in constructing apparatus of the class in question, I provide a motor, a change-speed gear, a clutch and a driving shaft, which form one combined unit, and I locate the change-speed gear and the clutch in a chamber provided for that purpose in the casing of the motor; the said change-speed gear and the clutch being preferably combined and constituted by an epicycloidal system, of which the planet members can be rendered immovable by means of a brake.

The invention comprises, in addition to these principal arrangements, certain other arrangements, which will be more fully described hereafter, especially an arrangement in which there is mounted on the crankshaft of the motor, the field magnets of an ignition magneto, of which the armature is mounted on the casing of the motor; an arrangement in which the casing of the motor is formed in one with the fixed portion of the hub of the wheel, driven by the said motor, and in which the driving shaft (which is driven through the intervention of the change-speed gear by the crank-shaft of the motor) is connected to the wheel itself; and an arrangement in which the motor casing is so mounted that the lubricant contained in the said casing which has served for lubricating the motor, is unable to escape, until it has lubricated the change-speed gear, and, if desired, the wheel itself.

In order that my said invention may be more clearly understood, I will now proceed to describe the same with reference to the accompanying drawings, it being however understood, that the description and drawings are given merely by way of example.

Figure 1 of the drawing shows a transverse section, taken through the axis of a rear motive wheel of a motor cycle, constructed according to a first method of carrying out my invention.

Fig. 2 is a section on a line 2—2, Fig. 1, illustrating the change-speed gear of the said motor cycle.

Fig. 3 shows a transverse section, through the axis of the rear motive wheel, of a motor cycle constructed according to a second method of carrying out my invention.

Figs. 4 and 5, show elevations of two motor cycles provided with a rear motive wheel, constructed according to my invention.

Fig. 6 is a section on the line 6—6, Fig. 5.

In the methods of carrying out the invention, illustrated in the drawings, which show, as previously stated, typical ways of applying the said invention to the back motive wheel of a motor cycle, I proceed as follows:

I provide an element comprising an explosion motor, a change-speed gear, a clutch and a driving axle.

For this purpose, I provide a motor $a$, having a casing $a^0$, which is preferably as liquid tight as possible. This casing is provided, upon one of its faces at right angles to the crank-shaft $a^1$ with a circular flange, forming a chamber $a^{00}$, in which is located the change-speed gear and the clutch. The said chamber is covered in by means of a plate having an aperture therein for the passage of the driving shaft $c$.

The casing of the motor is attached to the frame of the motor-cycle, and the driving axle is connected in any suitable manner to the driving wheel $d$ of the said motor cycle.

I may construct the apparatus simply with the improvements just described but I prefer to add the whole or a portion of the following arrangements.

For the purpose of providing, at the same time, a change-speed gear and a clutch, I provide an epicycloidal system, the planet members of which can be locked against movement by means of a brake or brakes. With this object in view, there is mounted loosely in the interior of the chamber $a^{00}$ upon a flanged extension in the casing which serves as a bearing for the crank-shaft $a^1$, a plate $e$. On the extremity of the driving shaft $c$, which extremity is located on the interior of the said chamber, is provided a plate $c^1$, and the plates $e$ and $c^1$ are connected by spindles $f$ parallel to the axis of the crank-shaft, and all located at the same distance from this axis. Mounted on each of these spindles $f$ is a series of toothed pinions, say for instance two, $f^1$ and $f^2$, of different diameters. Mounted on the crank-shaft is a toothed wheel $a^{10}$ meshing with the pinions $f^1$, one of the before-mentioned series of pinions. Each of the series of pinions $f^1$ and $f^2$ meshes with an internally toothed ring, $f^{10}$, $f^{20}$, around each of which is passed a band brake $g^1$, $g^2$. One of the extremities of each band brake is fixed to the flanged extension $a^{00}$, and the other extremity is connected to some suitable operating means.

With this construction, when the two rings turn freely, the shaft $c$ is not driven, and there is declutching. When the ring $f^{10}$ corresponding to the pinions $f^1$ of greater diameter, is locked from movement, by the brake $g^1$, the shaft $c$ turns with great velocity; while when the ring $f^{20}$, corresponding to the pinions $f^2$ of lesser diameter is locked from motion, by means of the brake $g^2$, the shaft $c$ turns with less velocity.

I prefer to provide, in a casing $a^{000}$ formed in one of the faces of the casing $a^0$, an ignition magneto, the armature $h$ of which is fixed to the casing, the field magnet $h^1$ being fixed to the crank-shaft and turning therewith. This arrangement possesses the advantage that no brushes or bearings have to be employed for the magneto, and that the said magneto can be easily and quickly taken to pieces and access be obtained to its parts.

I prefer to mount an element constructed as just described in relation to the motive wheel, by rigidly connecting the fixed hub of the wheel with the casing of the motor and connecting the driving shaft to the wheel itself in such a way that the element forms an integral part of the wheel, and is entirely supported thereby, all the power of the motor being transmitted directly to the motive wheel, without producing any strain on the frame. With this object in view, I prefer to construct the fixed hub $b^0$ of the wheel $d$ in tubular form the hub being so attached to the plate $b$, closing the chamber $a^{00}$, that it incloses the driving axle $c$. Fixed to the free extremity of the said axle, is a plate $c^2$, to which is connected a part $d^1$ of the hub, which is in rigid connection with the wheel, and which turns freely on a fixed hub $b^0$. With an arrangement of this description, the whole of the working parts, between the motor and the wheel, are entirely inclosed and protected from dust.

The casing is preferably so constructed, that the oil contained therein can only escape to the exterior through the bearings of the crank-shaft located on the side of the casing where the change-speed gear is situated, so that the oil, passing from the casing, lubricates the parts of the change-speed gear, and, after passing through the fixed hub $b^0$, lubricates the bearings of the wheel, before it can escape.

I provide, for the purpose of attaching a wheel furnished with its motor to the framework of the motor cycle, an arm $i$ fixed to the casing $a^0$, the said arm being sufficient to hold the wheel in place, projecting from the side thereof, without it being necessary to inclose the wheel by means of a fork; this arrangement allowing the pneumatic tire to be easily removed.

Where it is deemed desirable, another arm $i^0$ may be provided, constituting, with the arm $i$, a fork, and in this case, an extension of the shaft $c$, provided for this purpose, may engage in a bearing at the end of the said arm.

I may avoid mounting the wheel so that it projects at the side, by adopting the construction shown in Fig 3, in which the wheel is provided with a concave dished plate, allowing the center of gravity of the motor to be located in a vertical plane through the rim of the wheel.

I propose to employ, in place of an ordinary frame, for the cycle, a frame comprising, as shown at Figs. 4 and 5, a large tube $j$, which serves both as a reservoir for oil and as a tool-chest. This tube $j$ is connected at one end to and supported by, the steering wheel, and at the other end carries the saddle, and is connected to the casing of the motor.

This tube may be formed, with advantage, as shown at Figs. 5 and 6, from two dished or recessed metal plates.

As will be readily understood, the invention is not confined in any way to the methods of carrying it into effect which have been more particularly described, but includes all modifications falling within the scope of the claims.

What I claim and desire to secure by Letters Patent of the United States of America is:—

1. In driving means for the motive wheels of vehicles, and especially motorcycles, the combination of a motor having a casing, a change-speed gear, a clutch, and a driving shaft, the motor casing having a chamber housing the change-speed gear and the clutch, and an ignition magneto for the motor having its field magnets connected to the crank shaft of the motor and its armature fixed.

2. In driving apparatus for the motive wheels of vehicles, and especially motorcycles, the combination of a motor having a casing, a change-speed gear, a clutch, and a driving shaft, said casing housing the change-speed gear and the clutch, and a fixed hub for the driven wheel, said hub being attached to the casing of the motor, the wheel being connected to the driving shaft and rotatable on said hub.

3. In driving means for motor vehicles, and especially motorcycles, the combination of a motor having a substantially liquid-tight casing attached to the framework of the said vehicle, a shaft driven by the said motor, a chamber being formed in said casing on the side thereof facing said wheel and into which chamber the motor shaft passes, said chamber having its wall adjacent to the wheel fixed to the said casing, a tube fixed to the said wall and having its axis coincident with the axis of the motor shaft, another shaft having its axis in alinement with the motor shaft and extending through the said wall into said chamber, through said fixed tube and projecting beyond the distant end of said tube, a wheel rotatably mounted upon the said fixed tube, means for connecting the second mentioned shaft to the said wheel, and change-speed and clutching and unclutching means interposed between the two shafts and located in the said chamber, passages for lubricant leading from the said casing through the said chamber, the interior of the fixed tube and the bearings of the rotatable wheel substantially as described.

4. In driving means for motor vehicles, especially motorcycles, the combination of an explosion motor having a casing attached to the framework of the said vehicle, a shaft driven by the said motor, a chamber being formed in said casing on the side thereof facing the wheel, into which chamber the motor shaft passes, a wall to the said chamber adjacent to the wheel and fixed to the said casing, a tube fixed to the said wall and having its axis coincident with the axis of the motor shaft, another shaft one end of which passes through the said wall and into the said chamber, said shaft passing through the said fixed tube in alinement with the motor shaft and projecting from the other end of the fixed tube, a wheel rotatable on the said fixed tube, a plate fixed to said projecting end of the second mentioned shaft and attached to the rotatable wheel, a rotatable plate, rotatable loosely about a projecting portion of the casing through which the motor-shaft passes and contained within said chamber, another plate fixed to the end of the second mentioned shaft and contained within the said chamber, shafts parallel to the axis of the motor shaft and equidistant therefrom connecting said two plates within the said chamber, a series of pinions of different diameters upon the said shafts between the two plates, a gear wheel on the end of the motor shaft in the said chamber gearing with one set of pinions on the said shafts, internally toothed rings meshing with the pinions of each set, brake bands embracing the outsides of the said rings, and operating means for rendering any of the said rings immovable.

5. In mechanism for driving motor vehicles, especially motorcycles, the combination of a motor having a casing attached to the framework of such vehicle, a shaft driven by said motor, a tube fixed to the casing of the said motor and having its axis coincident with the axis of the motor shaft, another shaft having its axis in alinement with the motor shaft and passing through and extending beyond the said tube, a wheel rotatably mounted upon the said fixed tube, means for connecting the second-mentioned shaft to the said wheel, means for interconnecting the two shafts, a chamber being formed in the said casing into which chamber the motor shaft passes, a magneto having its field magnets carried by the motor shaft and within the said chamber, and having its armature fixed within the said chamber.

6. In means for driving motorcycles, the combination of a motor having a casing attached to one side of an arm extending from the framework of the cycle, a shaft driven by and having its axis coincident with the axis of the motor shaft, a tube fixed to the motor casing, the shaft passing through and extending beyond said first mentioned tube, a wheel rotatably mounted upon the said fixed tube, means for connecting the first mentioned shaft to said wheel, and means for interconnecting the two shafts.

7. In a motorcycle, the combination of a frame comprising a tubular chamber, a steering wheel and steering means connected to one end of said tubular chamber, a compartment for the reception of lubricant and for holding tools being provided inside said tubular chamber, a saddle mounted toward the other end of the said tubular chamber, an arm connected to the said tubular chamber, a motor having a casing attached to the said arm, a shaft driven by the said motor, a tube fixed to the casing of the said motor and having its axis coincident with the axis of the motor shaft, another shaft having its axis in alinement with the motor shaft and passing through and extending beyond the said tube, a wheel rotatably mounted upon the said fixed tube, means for connecting the second mentioned shaft to the said wheel, and means for interconnecting the two shafts.

In testimony whereof I have hereunto set my hand in presence of two subscribing witnesses.

MARCEL MENNESSON.

Witnesses:
CHAS. P. PRESSLY,
PAUL BLUM.

Copies of this patent may be obtained for five cents each, by addressing the "Commissioner of Patents, Washington, D. C."